March 15, 1949.  A. RAPPL  2,464,609
MOTOR VEHICLE BODY CONSTRUCTION
Filed Oct. 2, 1945  2 Sheets-Sheet 1
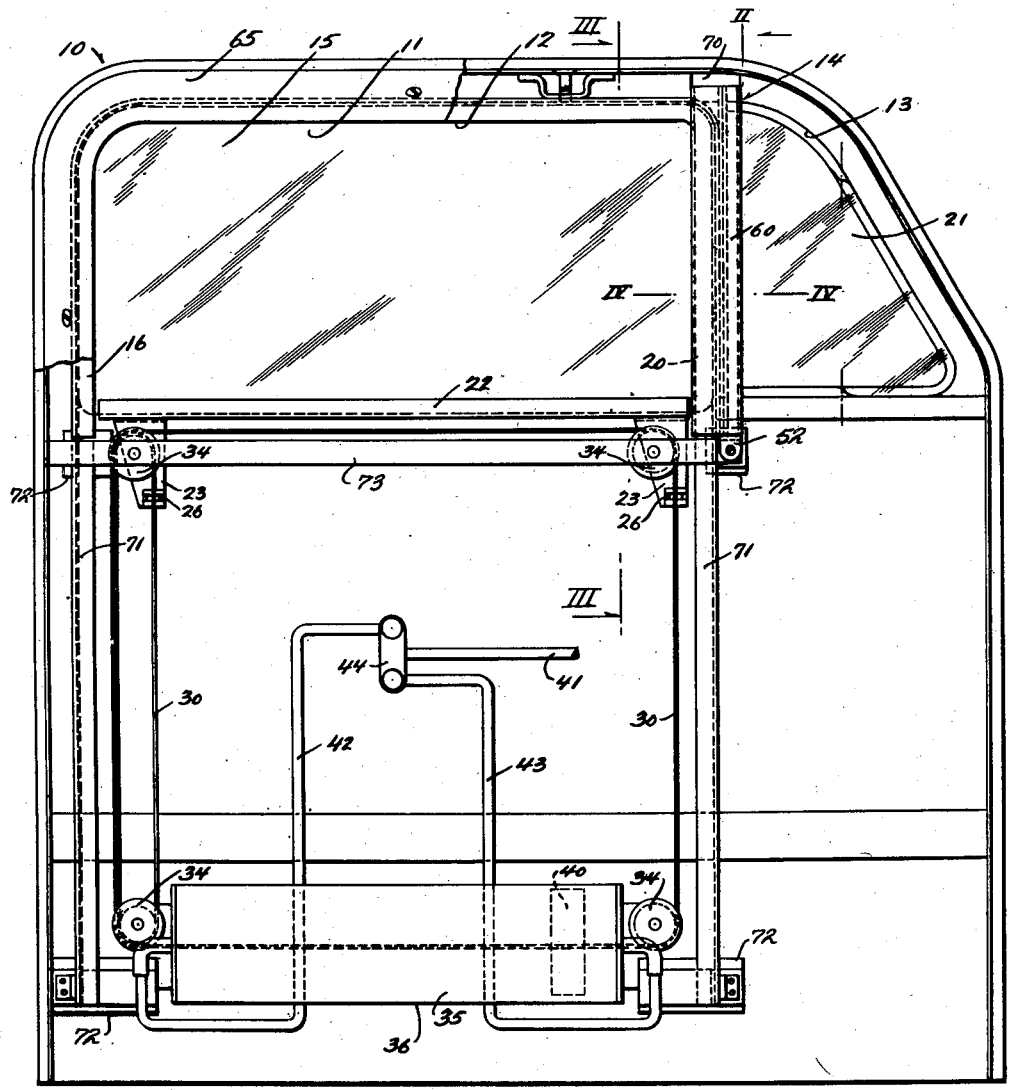
INVENTOR
Anton Rappl
BY
Bean, Brooks, Buckley & Bean
ATTORNEY

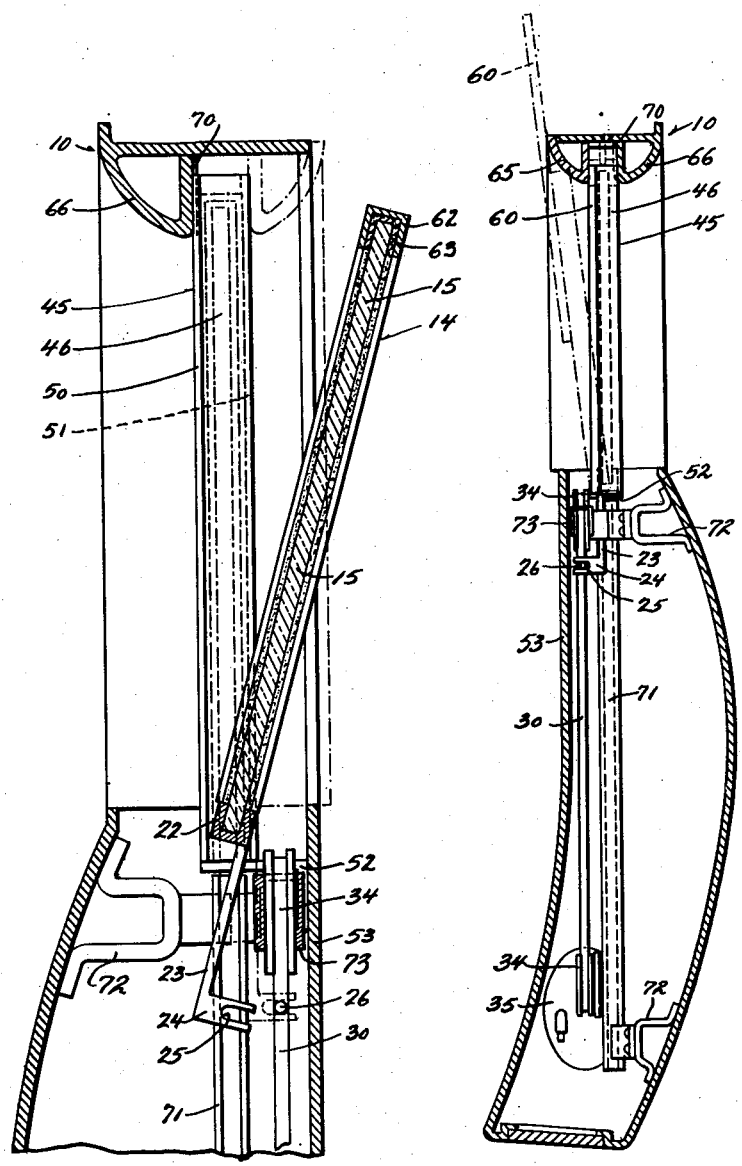

Patented Mar. 15, 1949

2,464,609

UNITED STATES PATENT OFFICE 2,464,609

MOTOR VEHICLE BODY CONSTRUCTION

Anton Rappl, Eggertsville, N. Y., assignor to Trico Products Corporation, Buffalo, N. Y.

Application October 2, 1945, Serial No. 619,800

7 Claims. (Cl. 296—44)

1

This invention relates in general to motor vehicle body structures having windows of the type actuated by a fluid motor, and specifically to means for mounting such windows.

The principal object of the invention has been to provide a motor vehicle body structure having window guides which may be readily removed to replace a broken glass and which greatly facilitate assembly.

Another object has been to provide a multi-part mullion which may be easily disassembled, thereby making the window panel accessible for ready removal or installation thereof.

Moreover, the invention contemplates the use of a mullion having a sliding lock member for keeping the separable parts thereof in assembled positions.

Furthermore, the invention has for its object to provide a window system so constructed and arranged within the wall structure of the vehicle as to render it practical and simple.

The above objects and advantages have been accomplished by the device shown in the accompanying drawings, of which:

Fig. 1 is a side elevation of the door of a vehicle body structure with portions thereof removed and showing the invention in use thereon;

Fig. 2 is a transverse sectional view thereof taken on line II—II of Fig. 1;

Fig. 3 is an enlarged fragmentary sectional view taken on line III—III of Fig. 1;

Fig. 4 is an enlarged transverse sectional fragmentary view taken on line IV—IV of Fig. 1; and Fig. 5 is an exploded view of the multi-part mullion bar of the invention.

While the invention is applicable to any part of a motor vehicle, for convenience of illustration, it has been shown as applied to the door thereof wherein the large window opening is divided by a mullion into two portions, similar to the construction of the present day car doors in which one sliding window and one pivotally mounted ventilator window are used.

In the drawings, 10 represents the door having a window opening 11 divided into two portions 12 and 13 by means of the mullion 14. As is customary, a sliding window panel 15 is mounted in suitable guideways 16 and 20. The guideway 16 is carried by the door structure, and guideway 20 is carried by the mullion 14. A ventilator window 21 of the usual type is pivotally mounted within the opening 13 and has its rear edge firmly supported by the mullion, as will hereinafter be described. The sliding window 15 is provided with the usual channel member 22 along its lower edge

2 to which are attached the brackets 23 that have inturned ends 24 formed with seats 25 of open slot formation (see Fig. 3). A lug 26 carried by the flexible power transmitting member 30 of the window operating means engages in each slotlike seat 25. This flexible member passes over suitable idler pulleys 34 and through the cylinder 35 of a power motor 36, being attached to the piston 40 of such motor. The motor is controlled by low pressure or vacuum through a supply pipe 41 connected to any suitable source, such for instance as the intake manifold of a vehicle engine, and this pipe is connected to opposite ends of the motor 36 by means of conduits 42 and 43 and controlled by a valve 44.

The mullion comprises a generally Z-shaped member 45 having a web 46 and oppositely extending ribs or flanges 50 and 51 at opposite edges of said web. The bottom end of this Z-shaped member is fixed and may be attached to the door structure by means of a bracket 52 on the inside wall 53 of the door while the upper end is free to be sprung outwardly as indicated by the broken line showing of Fig. 2. Arranged adjacent the web 46 of the rigid Z-shaped member on the sliding window side thereof is an angle-shaped member 54 which is provided with a flange 55 that abuts the web, and with a flange 56 extending outwardly therefrom. The Z-shaped member is so proportioned that the flange 56 will lie substantially in the same plane as the flange 51 of the Z-shaped member, and when so assembled a locking strip 60 will engage and interlock with the outer edges of the flanges of the two coacting members. The locking strip is slidably engaged with said members by longitudinal movement of the strip, thereby providing means for holding the members of the mullion bar together in assembled positions, but permitting their ready disassembly. The flanges 50 and 56 form a groove 61 for the reception of the guideway 20, this part, like its companion guideway 16, being composed of a channel 62 and a felt lining 63.

As shown, the guideways 16 and 20 extend downwardly preferably a slight distance below the bottom of the window opening. However, the ends of these guideways register with fixed guideways 71 carried by brackets 72 on the window or door structure for guiding and supporting the window 15 when lowered. The brackets 72 also serve to support the motor 36 as well as the frame member 73 on which the upper pulleys 34 are journaled.

The ventilator window 21 engages an angle-shaped rubber gasket 64 which has one of its flanges adjacent the web 46 of the Z-shaped member and the other flange adjacent the flange 51 thereof, whereby counter-clockwise movement of the window as viewed in Fig. 4 will cause the edge thereof to engage the gasket in a weathertight manner.

As is customary in vehicle body structures, a removable molding 65 is provided which normally abuts and conceals the window guideways. This molding usually extends from the window sill (not shown) around the entire window opening. A permanent molding 66 forming a part of the body structure is arranged opposite the molding 65 and serves, like the removable molding, to retain the guideways in position. The molding 66 is formed in its face which is opposite the upper end of the mullion bar 14 with a groove or depression 70 with which the upper end of the bar engages whereby it is steadied laterally when held in place by means of the removable molding 65.

From the foregoing it will be obvious that when it is desired to remove the sliding window panel 15 the removable molding 65 is detached from the window frame structure which exposes the upper end of the mullion 14. The upper end of the mullion when thus released is sprung outwardly to substantially the position shown in Fig. 2 where the locking strip 60 will clear the inner edge of the door frame structure whereupon it is moved upwardly as shown by the dot and dash line in Fig. 2. After the strip is removed from the mullion, the angle-shaped member 54 together with the metal channel 62 and felt lining 53 will be released and thereby permit the removal of the member 54. The window panel with its guiding channel and felt lining may now be moved to the position shown in Fig. 3. As here shown, movement of the window panel to this position will serve to cause the depending bracket 23 carried by the window channel 22 to become disengaged from the lug 26 of the flexible power transmitting member, whereupon the window may be lifted vertically from the well of the frame structure and thereby removed. Obviously, assembly of the parts will be by reversed operation.

While but one form of invention is shown and described in this application, it is obvious that detailed modifications may be made in the structure without departing from the spirit of the invention or the scope of the appended claims.

I claim:

1. A motor vehicle body structure having a window opening divided by a mullion, a window panel slidable on the mullion for closing one portion of the opening, said mullion having a fixed member and a removable member giving slidable support to the panel along one edge thereof, each member having longitudinal ribs, and means slidably interlocking with the ribs of the two members to form the mullion.

2. A motor vehicle body structure having a window opening divided by a mullion and a panel slidable on the mullion for closing one portion of the opening, the body structure and the mullion having opposed guideways slidably supporting the panel, said mullion having a fixed part and a retaining part slidably interlocked together by relative longitudinal movement, said retaining part being removable to enable displacement of its guideway, and said body structure having a molding strip removably secured in position to secure its guideway in place and additionally to hold said retaining part of the mullion operative.

3. A motor vehicle body structure having a window opening divided by a mullion and a panel slidable on the mullion for closing one portion of the opening, the body structure and the mullion having opposed guideways slidably supporting the panel, said mullion having a body member fixed at one end to said body structure, said body structure overhanging the opposite end of the mullion, and guideway retaining means slidably interlocked with said fixed body member and removably displaced from the latter by being slid off said opposite end of the mullion, said opposite end of the mullion adapted to be sprung from its normal position to clear the overhanging body structure.

4. A motor vehicle body structure having a window opening divided by a mullion and a panel slidable on the mullion for closing one portion of the opening, the body structure and the mullion having opposed guideways slidably supporting the panel, said mullion having a body member fixed at one end to said body structure, said body structure overhanging the opposite end of the mullion, guideway retaining means slidably interlocked with said fixed body member and removably displaced from the latter by being slid off said opposite end of the mullion, said opposite end of the mullion adapted to be sprung from its normal position to clear the overhanging body structure, and a molding for the window opening removably secured to the body structure and interlocking with the mullion to support the same in its operative position.

5. A motor vehicle body structure having a window opening divided by a mullion and a panel slidable on the mullion for closing one portion of the opening, the body structure and the mullion having opposed guideways slidably supporting the panel, operating means carried by said body structure and detachably connected to said panel for moving the same in said guideways, said mullion having a body member fixed at one end to said body structure, said body structure overhanging the opposite end of the mullion, and guideway retaining means slidably interlocked with said fixed body member and removably displaced from the latter by being slid off said opposite end of the mullion, said opposite end of the mullion adapted to be sprung from its normal position to clear the overhanging body structure, said operating means being adapted to be disconnected from said panel when the latter is released from said mullion.

6. A motor vehicle structure having an opening, a mullion dividing said opening into two portions, a sliding window panel supported in one of said portions, a pivotally mounted ventilator window panel supported in the other of said portions, opposed channel guides for said sliding window, said mullion comprising a substantially rigid member carried by said vehicle structure, said rigid member being of Z-shape and having spaced flanges extending from a connecting web in planes substantially parallel with the window panel, an angle-shaped member coacting with said rigid member and having one flange adjacent the web thereof and the other flange lying in substantially the same plane as one of the flanges of said rigid member and extending oppositely thereto, thus forming with the oppositely extending flange of the rigid member a channel-receiving groove for the adjacent window channel guides, and a locking strip slidably engaging the opposed flanges of said rigid and angle-shaped members, said strip being slidable longitudinally to permit disengagement of said angle-shaped member when said rigid member is flexed.

7. Means for mounting a slidable vehicle window having a window channel for removable molding, comprising a substantially rigid bar flexibly attached to the window frame structure, said bar being of Z-shape and having spaced flanges joined by a web and extending in planes substantially parallel with the window panel, an angle-shaped member coacting with said bar and having one flange adjacent the web thereof and the other flange lying in substantially the same plane as one of the flanges of said bar and extending oppositely thereto, thus forming with the oppositely extending flange of the bar a channel-receiving groove for the window channel, and a locking strip slidably engaging the opposed flanges of said bar and said angle-shaped member, said strip being slidable longitudinally to permit disengagement of said angle-shaped member when said bar is flexed.

ANTON RAPPL.

REFERENCES CITED

The following references are of record in the file of this patent:

UNITED STATES PATENTS

| Number | Name | Date |
|---|---|---|
| 1,980,313 | Axe | Nov. 13, 1934 |
| 1,981,192 | Plym et al. | Nov. 20, 1934 |
| 2,021,719 | Field et al. | Nov. 19, 1935 |